US011222064B2

(12) United States Patent
Kale et al.

(10) Patent No.: US 11,222,064 B2
(45) Date of Patent: Jan. 11, 2022

(54) GENERATING STRUCTURED QUERIES FROM IMAGES

(71) Applicant: eBay Inc., San Jose, CA (US)

(72) Inventors: Ajinkya Gorakhnath Kale, San Jose, CA (US); Manojkumar Rangasamy Kannadasan, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 564 days.

(21) Appl. No.: 14/985,913

(22) Filed: Dec. 31, 2015

(65) Prior Publication Data

US 2017/0193011 A1 Jul. 6, 2017

(51) Int. Cl.
| | | |
|---|---|---|
| G06F 16/00 | (2019.01) | |
| G06F 16/532 | (2019.01) | |
| G06N 20/00 | (2019.01) | |
| G06F 16/248 | (2019.01) | |
| G06F 16/583 | (2019.01) | |
| G06F 16/242 | (2019.01) | |
| G06N 3/08 | (2006.01) | |
| G06Q 30/06 | (2012.01) | |

(52) U.S. Cl.
CPC .......... *G06F 16/532* (2019.01); *G06F 16/248* (2019.01); *G06F 16/2425* (2019.01); *G06F 16/583* (2019.01); *G06N 3/08* (2013.01); *G06N 20/00* (2019.01); *G06Q 30/0623* (2013.01)

(58) Field of Classification Search
None
See application file for complete search history.

(56) References Cited

U.S. PATENT DOCUMENTS

| 5,835,965 A | 11/1998 | Taylor et al. |
| 5,838,965 A * | 11/1998 | Kavanagh ......... G06F 17/30348 |
| 6,078,916 A | 6/2000 | Culliss |
| 8,548,981 B1 | 10/2013 | Bhattacharjee et al. |
| 8,566,339 B2 | 10/2013 | Jammalamadaka |
| 8,583,675 B1 | 11/2013 | Haahr et al. |
| 8,874,555 B1 | 10/2014 | Kim et al. |
| 10,922,327 B2 | 2/2021 | Somaiya et al. |

(Continued)

FOREIGN PATENT DOCUMENTS

| CN | 102063468 A | 5/2011 |
| CN | 102955821 A | 3/2013 |

(Continued)

OTHER PUBLICATIONS

Bossard et al. ACCV'12 Proceedings of the 11th Asian conference on Computer Vision—vol. Part IV pp. 321-335 . Nov. 2012.*

(Continued)

*Primary Examiner* — Tuankhanh D Phan
(74) *Attorney, Agent, or Firm* — Shook, Hardy & Bacon L.L.P.

(57) ABSTRACT

Images of items often include a significant amount of information that can be used in categorizing the item (e.g., as a book, a phone, or an accessory) or in identifying attributes of the item (e.g., the item's color or style). A user provides a search query for listings of items. Images of items in listings previously selected by users providing the same search query are analyzed to identify the category or attributes of the depicted items. The identified category or attributes are added to the user's search query. Listings matching the modified search query are provided to the user.

16 Claims, 10 Drawing Sheets

(56) References Cited

U.S. PATENT DOCUMENTS

| | | | |
|---|---|---|---|
| 2006/0026147 A1 | 2/2006 | Cone et al. | |
| 2006/0064411 A1 | 3/2006 | Gross et al. | |
| 2007/0055616 A1 | 3/2007 | Clay et al. | |
| 2007/0180401 A1 | 8/2007 | Singh et al. | |
| 2007/0198488 A1* | 8/2007 | Altounian | G06Q 30/06 |
| 2007/0250901 A1* | 10/2007 | McIntire | H04N 7/17318 |
| | | | 725/146 |
| 2008/0114622 A1 | 5/2008 | Crean et al. | |
| 2009/0119254 A1 | 5/2009 | Cross et al. | |
| 2009/0125435 A1 | 5/2009 | Cohen et al. | |
| 2009/0132340 A1 | 5/2009 | Demir et al. | |
| 2009/0240683 A1 | 9/2009 | Lazier et al. | |
| 2011/0119754 A1 | 5/2011 | Larsen et al. | |
| 2012/0005045 A1 | 1/2012 | Baker | |
| 2012/0047134 A1 | 2/2012 | Hansson et al. | |
| 2012/0197751 A1 | 8/2012 | Zatkin et al. | |
| 2013/0053005 A1 | 2/2013 | Ramer et al. | |
| 2013/0067364 A1* | 3/2013 | Berntson | G06F 3/048 |
| | | | 715/764 |
| 2013/0080423 A1 | 3/2013 | Parikh et al. | |
| 2013/0086509 A1 | 4/2013 | Satyanarayana et al. | |
| 2013/0254308 A1 | 9/2013 | Rose et al. | |
| 2014/0143268 A1 | 5/2014 | Finkelstein et al. | |
| 2015/0088921 A1 | 3/2015 | Somaiya et al. | |
| 2015/0161256 A1 | 6/2015 | Jeh et al. | |
| 2016/0328459 A1 | 11/2016 | Somaiya et al. | |
| 2017/0193011 A1 | 7/2017 | Kale et al. | |
| 2017/0193636 A1* | 7/2017 | Kita | G06T 7/13 |
| 2019/0340173 A1 | 11/2019 | Somaiya et al. | |

FOREIGN PATENT DOCUMENTS

| | | | | |
|---|---|---|---|---|
| CN | 103778227 A | 5/2014 | | |
| CN | 104866474 A | 8/2015 | | |
| WO | WO-2015032670 A1 * | 3/2015 | | G06K 9/6256 |
| WO | WO-2017116691 A1 | 7/2017 | | |

OTHER PUBLICATIONS

Booker, Ellis, "Information Week: Why Recommendation Engines Are About to Get Much Better", [Online]. Retrieved from the Internet: <URL: http://www.informationweek.com/big-data/big-data-analytics/why-recommendation-engines-are-about-to-get-much-better/d/d-id/1111646?print=yes&page_numbe>, (Sep. 23, 2013), 3 pgs.

Gaughran, David, "Understanding Amazon's Recommendation Engine: Making Indie—Publishing a Mission Possible", [Online], Retrieved from the Internet: <URL: http:/www.indierecon.org/2014/02/understanding-amazons-recommendation.html>, (Feb. 27, 2014), 4 pgs.

Jones, Rosie, et al., "Generating Query Substitutions", International World Wide Web Conference Committee (IW3C2)., (2006), 10 pgs.

"International Application Serial No. PCT/US2016/066387, International Search Report dated Feb. 23, 2017", 2 pgs.

"International Application Serial No. PCT/US2016/066387, Written Opinion dated Feb. 23, 2017", 5 pgs.

International Preliminary Report on Patentability received for PCT Application No. PCT/US2016/066387, dated Jul. 12, 2018, 7 pages.

Extended European Search Report Received for European Patent Application No. 16882307.8, dated May 28, 2019, 11 pages.

Bossard et al., "Apparel Classification With Style", Retrieved from the internet URL: <https://data.vision.ee.ethz.ch/cvl/Ibossard/accv12/>, 2012, pp. 1-14.

Response to Extended European Search Report filed on Sep. 23, 2019 for European Patent Application No. 16882307.8, dated May 28, 2019, 19 pages.

Applicant Initiated Interview Summary received for U.S. Appl. No. 14/200,913, dated Dec. 17, 2018, 3 pages.

Applicant Initiated Interview Summary received for U.S. Appl. No. 14/200,913, dated Oct. 4, 2016, 3 pages.

Applicant Initiated Interview Summary received for U.S. Appl. No. 14/200,913, dated Oct. 26, 2017, 3 pages.

Applicant Initiated Interview summary received for U.S. Appl. No. 14/200,913, dated Apr. 2, 2019, 3 pages.

Applicant Initiated Interview Summary received for U.S. Appl. No. 14/200,913, dated Jun. 7, 2017, 3 pages.

Applicant Interview Summary received for U.S. Appl. No. 14/200,913, dated Mar. 27, 2018, 3 Pages.

Final Office Action received for U.S. Appl. No. 14/200,913, dated May 31, 2018, 17 pages.

Final Office Action received for U.S. Appl. No. 14/200,913, dated Aug. 9, 2017, 18 pages.

Final Office Action received for U.S. Appl. No. 14/200,913, dated Feb. 15, 2019, 18 pages.

Final Office Action received for U.S. Appl. No. 14/200,913, dated Sep. 9, 2016, 17 pages.

Non-Final Office Action for U.S. Appl. No. 14/200,913, dated Dec. 13, 2017, 21 pages.

Non-Final Office Action received for U.S. Appl. No. 14/200,913, dated Feb. 26, 2016, 14 pages.

Non-Final Office Action received for U.S. Appl. No. 14/200,913, dated Mar. 7, 2017, 20 pages.

Non-Final Office Action received for U.S. Appl. No. 14/200,913, dated Sep. 28, 2018, 18 pages.

Response to Final Office Action filed on Oct. 27, 2017 for U.S. Appl. No. 14/200,913, dated Aug. 9, 2017, 14 pages.

Response to Final Office Action filed on Sep. 29, 2016 for U.S. Appl. No. 14/200,913, dated Sep. 9, 2016, 9 pages.

Response to Non-Final Office Action filed on Dec. 28, 2018, for U.S. Appl. No. 14/200,913, dated Sep. 28, 2018, 15 pages.

Response to Non-Final Office Action filed on Apr. 18, 2018, for U.S. Appl. No. 14/200,913, dated Dec. 13, 2017, 19 pages.

Response to Non-Final Office Action filed on Jun. 7, 2017 for U.S. Appl. No. 14/200,913 dated Mar. 7, 2017, 10 pages.

Response to Non-Final Office Action filed on May 26, 2016 for U.S. Appl. No. 14/200,913 dated Feb. 26, 2016, 10 pages.

Advisory Action received for U.S. Appl. No. 15/212,073, dated Jun. 29, 2018, 3 pages.

Applicant Interview summary received for U.S. Appl. No. 15/212,073 dated Sep. 9, 2019, 3 pages.

Applicant Initiated Interview Summary Received for U.S. Appl. No. 15/212,073, dated Dec. 13, 2019, 3 pages.

Applicant Initiated Interview Summary Received for U.S. Appl. No. 15/212,073, dated Mar. 30, 2020, 3 Pages.

Applicant Initiated Interview Summary received for U.S. Appl. No. 15/212,073, dated Nov. 7, 2017, 3 pages.

Final Office Action received for U.S. Appl. No. 15/212,073, dated Mar. 29, 2018, 27 pages.

Final Office Action received for U.S. Appl. No. 15/212,073, dated Nov. 5, 2019, 15 Pages.

Non Final Office Action received for U.S. Appl. No. 15/212,073, dated Jan. 21, 2020, 14 pages.

Non-Final Office Action received for U.S. Appl. No. 15/212,073, dated Jul. 12, 2017, 15 pages.

Non-Final Office Action received for U.S. Appl. No. 15/212,073, dated Jun. 3, 2019, 14 pages.

Notice to Non-Compliant or Non-Responsive Amendment received for U.S. Appl. No. 15/212,073, dated Jul. 19, 2018, 3 pages.

Communication Pursuant to Article 94(3) EPC Received for European Patent Application No. 16882307.8, dated Apr. 2, 2020, 7 pages.

Response to Final Office Action filed on Dec. 31, 2019 for U.S. Appl. No. 15/212,073, dated Nov. 5, 2019, 14 pages.

Response to Final Office Action filed on Jun. 29, 2018 for U.S. Appl. No. 15/212,073 dated Mar. 29, 2018, 19 pages.

Response to Final Office Action filed on May 25, 2018, for U.S. Appl. No. 15/212,073, dated Mar. 29, 2018, 19 pages.

Response to Non Compliant Amendment filed on Jul. 30, 2018, for U.S. Appl. No. 15/212,073, dated Jul. 19, 2018, 10 pages.

Response to Non-Final Office Action Filed on Sep. 18, 2019, for U.S. Appl. No. 15/212,073, dated Jun. 3, 2019, 13 pages.

Response to Non-Final Office Action filed on Oct. 12, 2017, for U.S. Appl. No. 15/212,073, dated Jul. 12, 2017, 17 pages.

(56) References Cited

OTHER PUBLICATIONS

Supplemental Response or Amendment to Non-Final Office Action filed on Oct. 31, 2017, for U.S. Appl. No. 15/212,073, dated Jul. 12, 2017, 15 pages.
Preliminary Amendment received for U.S. Appl. No. 16/413,549, filed Jul. 24, 2019, 9 pages.
Response to Non-Final Office Action filed on Apr. 21, 2020, for U.S. Appl. No. 15/212,073, dated Jan. 21, 2020, 16 pages.
Response to Communication Pursuant to Article 94(3) filed on Jul. 10, 2020, for European Patent Application No. 16882307.8, dated Apr. 2, 2020, 15 pages.
Notice of Allowance received for U.S. Appl. No. 15/212,073, dated Sep. 2, 2020, 13 pages.
Notice of Allowance received for U.S. Appl. No. 15/212,073, dated Oct. 9, 2020, 12 pages.
Non Final Office Action Received for U.S. Appl. No. 16/413,549, dated Apr. 27, 2021, 15 pages.
Office Action received for Chinese Patent Application No. 201680081916.1, dated Jul. 28, 2021, 10 pages.
Summons To Attend Oral Proceeding Received for European Patent Application No. 16882307.8, dated Oct. 35, 2021, 10 pages.
Final Office Action received for U.S. Appl. No. 16/413,549, dated Oct. 22, 2021, 15 pages.

\* cited by examiner

GENERATING STRUCTURED QUERIES FROM IMAGES

TECHNICAL FIELD

The subject matter disclosed herein generally relates to computer systems that process queries. Specifically, the present disclosure addresses systems and methods related to efficient retrieval of data in response to a query.

BACKGROUND

Items in a database can have associated attributes. Search queries for items in the database may include attributes as well as search terms. The items returned for a search query may be limited to those matching the search terms and having the matching attributes.

BRIEF DESCRIPTION OF THE DRAWINGS

Some embodiments are illustrated, by way of example and not limitation, in the figures of the accompanying drawings.

DETAILED DESCRIPTION

Figure 1:
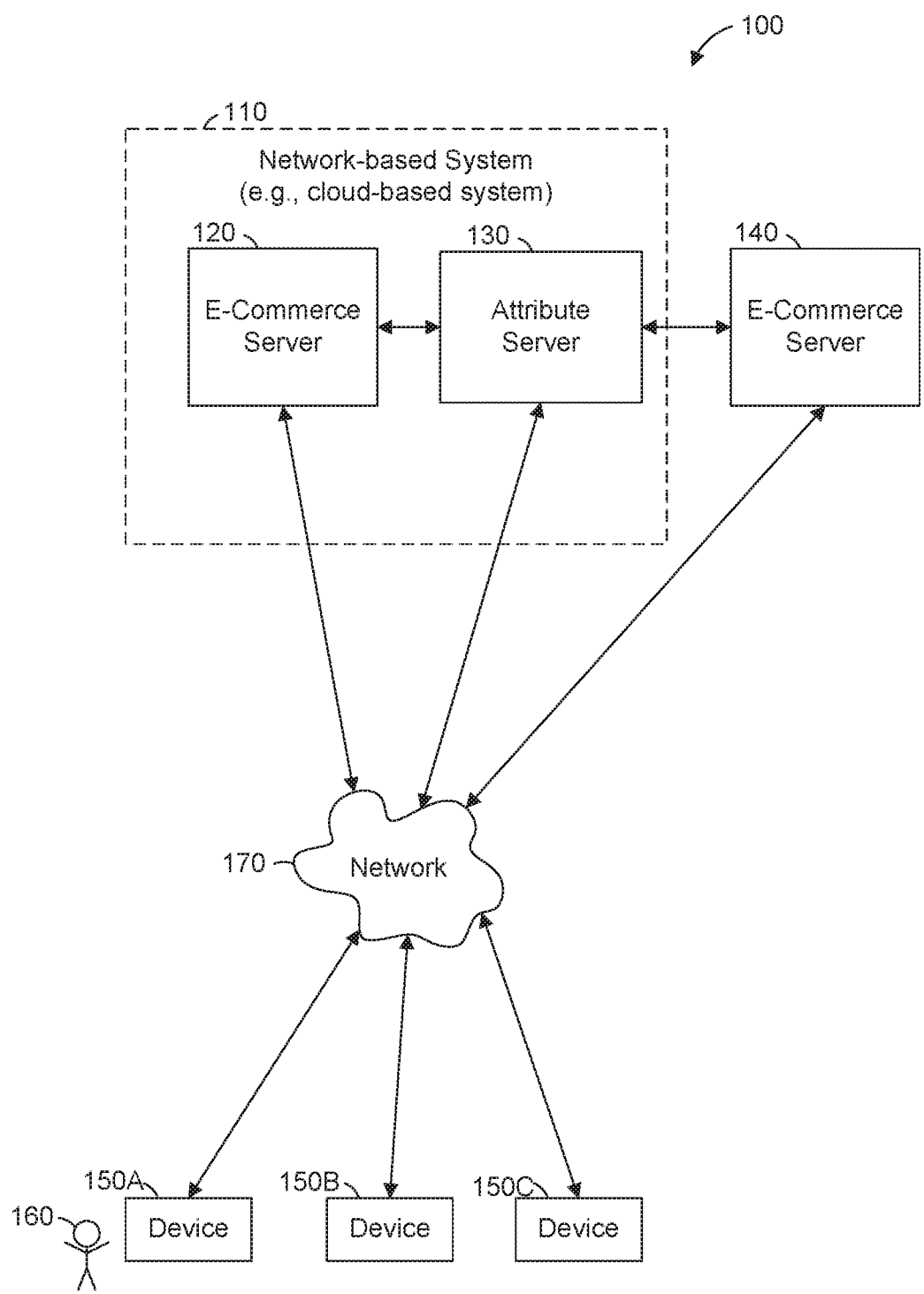
FIG. 1 is a network diagram illustrating a network environment suitable for generating structured queries from images, according to some example embodiments.

Example methods and systems are directed to generating structured queries based on images used in item listings. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An e-commerce platform provides search functionality by which users can search for item listings for items of interest to the users. For example, a user may enter a search string such as "red nike basketball shoes." Search results may be identified by searching for each word in the search string in descriptive text of the item listings. Accordingly, listings containing all of the words in the query will be ranked more highly than listings lacking one or more of the words, listings containing multiple repetitions of the words will be ranked more highly than listings using the words only once, and so on.

The search query may also include attributes. An item listing indicates attributes of the item separate from the text description of the item. In some example embodiments, attributes are predefined by the e-commerce platform. For example, if Nike® and Adidas® are brands of shoes recognized by the e-commerce platform, the creator of an item listing may be presented with radio buttons for the two brands and permitted to select a brand as an attribute of the item listing. Similarly, a searching user may indicate the brand as an attribute of the search. In this case, the search results may be limited to those item listings having the matching attribute. For example, a text search for "red nike basketball shoes" would match an item listing including the description "red basketball shoes, not nike," but a search for "red basketball shoes" with an attribute of "brand::nike," would not match the listing unless the creator deliberately marked the listing as being for the Nike® brand.

Example types of attributes include sizes (e.g., small, medium, large, extra-large, or numeric sizes such as size 6 and size 8), brands (e.g., Nike®, Adidas®, or Levi's®), colors, categories (e.g., "books," "clothes," "collectibles," or "cars"), and styles (e.g., flats or heels for shoes, long or short for skirts, and fedora or baseball cap for hats). Since attribute searches are more likely to exclude unwanted items than plain text searches including the attribute, methods and systems described herein that intelligently add attributes to search queries improve existing search systems by increasing the quality of search results. In some example embodiments, each item listing belongs to exactly one leaf category. To distinguish between the attribute of a category and other attributes, other attributes may be referred to as "aspects."

Machine learning systems are used to classify images. For example, a convolutional neural network (CNN) can be trained on a training set of images to be able to determine whether or not an input image depicts a shoe or not. Similarly, a CNN can be trained to determine whether an input image containing a shoe contains a flat or heeled shoe. As another example, a machine learning system can learn to identify the pixels in an image belonging to the foreground item. The pixels belonging to the foreground item can be averaged to determine the color of the foreground item. Thus, by passing a particular image through a number of image classifiers, details regarding an item depicted in the image can be automatically determined.

In some example embodiments, a two-stage process is used. In the first stage, usage information is mined to identify images associated with item listings that are interacted with in response to particular queries. To illustrate, each time a particular query is used, a set of item listings is presented to the querying user in response to the query. The user interacts with zero or more of the presented item listings (e.g., by clicking on the title of the item listing to see additional information). The interacted-with listings are associated with the query. Accordingly, at a later time, the set of listings associated with the query across all users can be accessed. Images associated with the listings in the set are fed to the trained image classifiers to identify attributes of the depicted items. For example, if 90% of item listings interacted with after a search for "pretty shoes" have heels and only 10% are flats, the attribute of "style::high-heels" may be associated with the search query "pretty shoes."

In the second stage, a user enters a query and the attributes associated with the query during the first stage are retrieved from a database. In some example embodiments, one or more of the retrieved attributes are applied to the user's search query and the modified query is used to select the item listings to present to the user. In additional example embodiments, one or more of the retrieved attributes are presented in a user interface to the user, enabling the user to quickly add the attributes to the query.

In some example embodiments, when a new listing is created, the trained image classifiers are fed the images associated with the listing. One or more attributes associated with the images by the image classifiers can be automatically added to the listing. The attributes associated with the images by the image classifiers may be compared to the attributes added by the creator of the listing. If the two sets of attributes conflict, an alert may be generated and sent to an administrator of the e-commerce site, to the creator of the listing, or both. For example, if the images show a shoe of a knock-off brand but the seller indicated that the listing is for a name brand, a conflict may be detected and an administrator alerted that the seller is attempting to mislead users.

FIG. 1 is a network diagram illustrating a network environment 100 suitable for generating structured queries from images, according to some example embodiments. The network environment 100 includes e-commerce servers 120 and 140, an attribute server 130, and devices 150A, 150B, and 150C, all communicatively coupled to each other via a network 170. The devices 150A, 150B, and 150C may be collectively referred to as "devices 150," or generically referred to as a "device 150." The e-commerce servers 120 and 140 and the attribute server 130 may be part of a network-based system 110. Alternatively, the devices 150 may connect to the attribute server 130 directly or over a local network distinct from the network 170 used to connect to the e-commerce server 120 or 140. The e-commerce servers 120 and 140, the attribute server 130, and the devices 150 may each be implemented in a computer system, in whole or in part, as described below with respect to FIGS. 9-10.

The e-commerce servers 120 and 140 provide an electronic commerce application to other machines (e.g., the devices 150) via the network 170. The e-commerce servers 120 and 140 may also be connected directly to, or integrated with, the attribute server 130. In some example embodiments, one e-commerce server 120 and the attribute server 130 are part of a network-based system 110, while other e-commerce servers (e.g., the e-commerce server 140) are separate from the network-based system 110. The electronic commerce application may provide a way for users to buy and sell items directly to each other, to buy from and sell to the electronic commerce application provider, or both.

Also shown in FIG. 1 is a user 160. The user 160 may be a human user (e.g., a human being), a machine user (e.g., a computer configured by a software program to interact with the devices 150 and the attribute server 130), or any suitable combination thereof (e.g., a human assisted by a machine or a machine supervised by a human). The user 160 is not part of the network environment 100, but is associated with the devices 150 and may be a user of the devices 150. For example, the device 150 may be a sensor, a desktop computer, a vehicle computer, a tablet computer, a navigational device, a portable media device, or a smart phone belonging to the user 160.

In some example embodiments, the attribute server 130 receives data regarding an item of interest to a user. For example, a camera attached to the device 150A can take an image of an item the user 160 wishes to sell and transmit the image over the network 170 to the attribute server 130. The attribute server 130 identifies attributes for the item based on the image. Attributes for the identified item can be sent to the e-commerce server 120 or 140, to the device 150A, or any combination thereof. The attributes can be used by the e-commerce server 120 or 140 to aid in generating a listing of the item for sale. Similarly, the image may be of an item of interest to the user 160, and the attributes can be used by the e-commerce server 120 or 140 to aid in selecting listings of items to show to the user 160.

As another example, the user 160 may provide a text string as a query to search for item listings of interest. In this example, the query is sent from a device 150 to the attribute server 130 (optionally intermediated by the e-commerce server 120 or 140). The attribute server 130 identifies one or more attributes associated with the query and provides the identified attributes to the e-commerce server 120 or 140 (optionally intermediated by the device 150). The e-commerce 120 or 140 modifies the query based on the identified attributes and provides item listings matching the modified query to the device 150.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 9-10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 170 may be any network that enables communication between or among machines, databases, and devices (e.g., the attribute server 130 and the devices 150). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
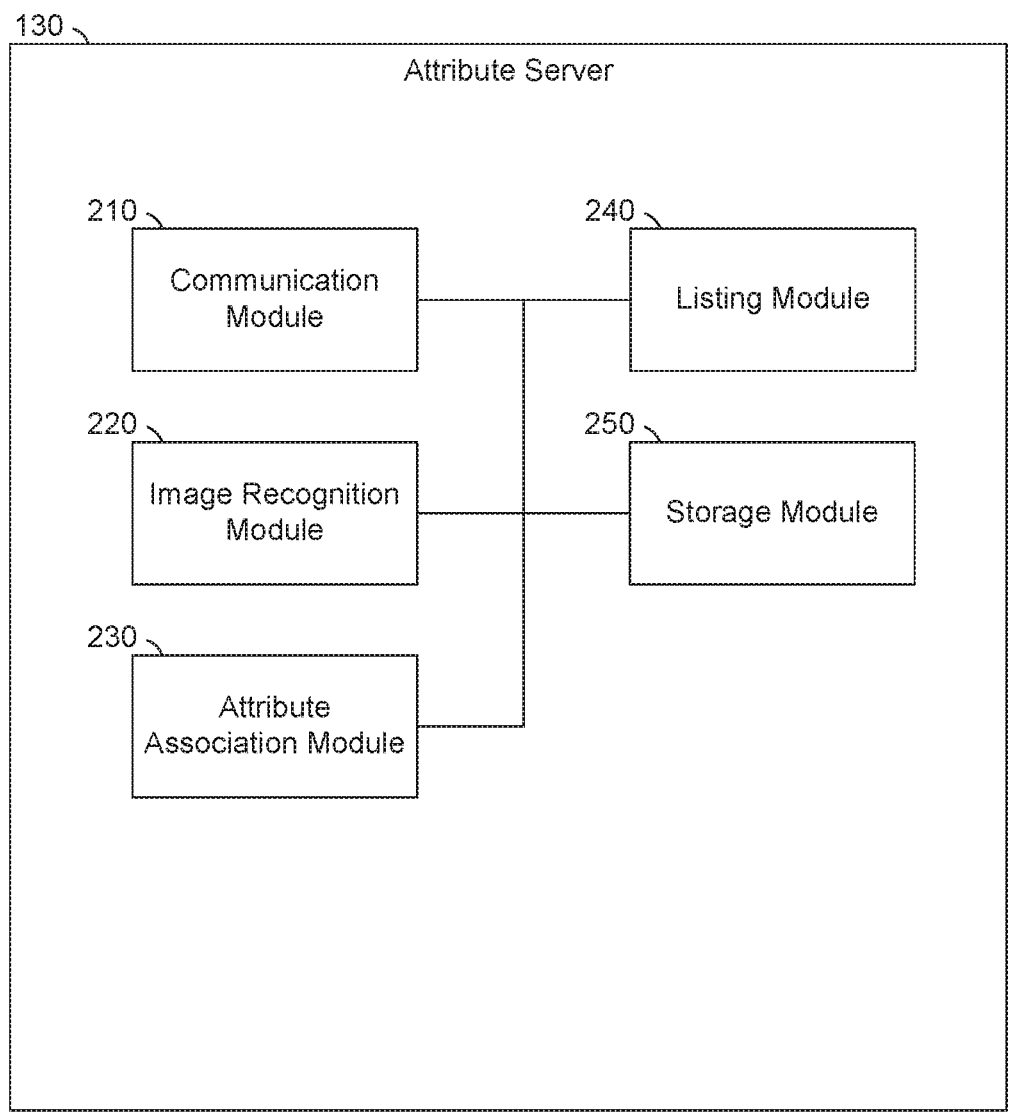
FIG. 2 is a block diagram illustrating components of an attribute server suitable for generating structured queries from images, according to some example embodiments.

FIG. 2 is a block diagram illustrating components of the attribute server 130, according to some example embodiments. The attribute server 130 is shown as including a communication module 210, an image recognition module 220, an attribute association module 230, a listing module 240, and a storage module 250 all configured to communicate with each other (e.g., via a bus, shared memory, or a switch). Any one or more of the modules described herein may be implemented using hardware (e.g., a processor of a machine). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive image data over the network 170 and send the received data to the image recognition module 220. As another example, the attribute association module 230 may determine attributes for a depicted item or a query, and the attributes for the item may be transmitted by the communication module 210 over the network 170 to the e-commerce server 120 or 140. The image data may be a two-dimensional image, a frame from a continuous video stream, a three-dimensional image, a depth image, an infrared image, a binocular image, or any suitable combination thereof.

The image recognition module 220 is configured to generate a set of categories for an item depicted in an input image, using image matching techniques. For example, an image depicting a pair of red high-heeled shoes may be categorized as depicting a red item, as depicting shoes, and as depicting high-heeled shoes. In some example embodiments, the categorization process involves nested image recognition. For example, a convolutional neural network (CNN) capable of distinguishing between high-heeled and flat shoes may be invoked only if a more general CNN determines that shoes are depicted in the image.

The attribute association module 230 is configured to associate attributes with a query and store the association in the storage module 250. For example, the e-commerce system 120 may use a database table in the storage module 250 to associate each query with item listings interacted with after their presentation in response to the query. The item listings may include images. The attribute association module 230 provides the images of the item listings as input to the image recognition module 220 to identify a set of attributes associated with the images associated with the item listings. At least a subset of the identified set of attributes are associated with the query by the attribute association module 230; the associations are stored in the storage module 250.

The listing module 240 is configured to generate an item listing for an item using attributes identified by the image recognition module 220. For example, after a user has uploaded an image depicting an item and attributes of the item are successfully identified, the listing module 240 may create an item listing including one or more of the identified attributes. The user may be prompted to confirm or modify the generated listing, or the generated listing may be published automatically in response to the identification of the attributes. The listing may be sent to the e-commerce server 120 or 140 via the communication module 210. In some example embodiments, the listing module 240 is implemented in the e-commerce server 120 or 140 and the listing is generated in response to an identifier for the item being sent from the attribute server 130 to the e-commerce server 120 or 140.

The storage module 250 is configured to store and retrieve data generated and used by the image recognition module 220, the attribute association module 230, and the listing module 240. For example, the classifier used by the image recognition module 220 can be stored by the storage module 250. Information regarding identification of attributes depicted in an image, generated by the attribute association module 230, can also be stored by the storage module 250.

The e-commerce server 120 or 140 can request identification of attributes of an item in an image (e.g., by providing the image, an image identifier, or both), which can be retrieved from storage by the storage module 250 and sent over the network 170 using the communication module 210.

Figure 3:
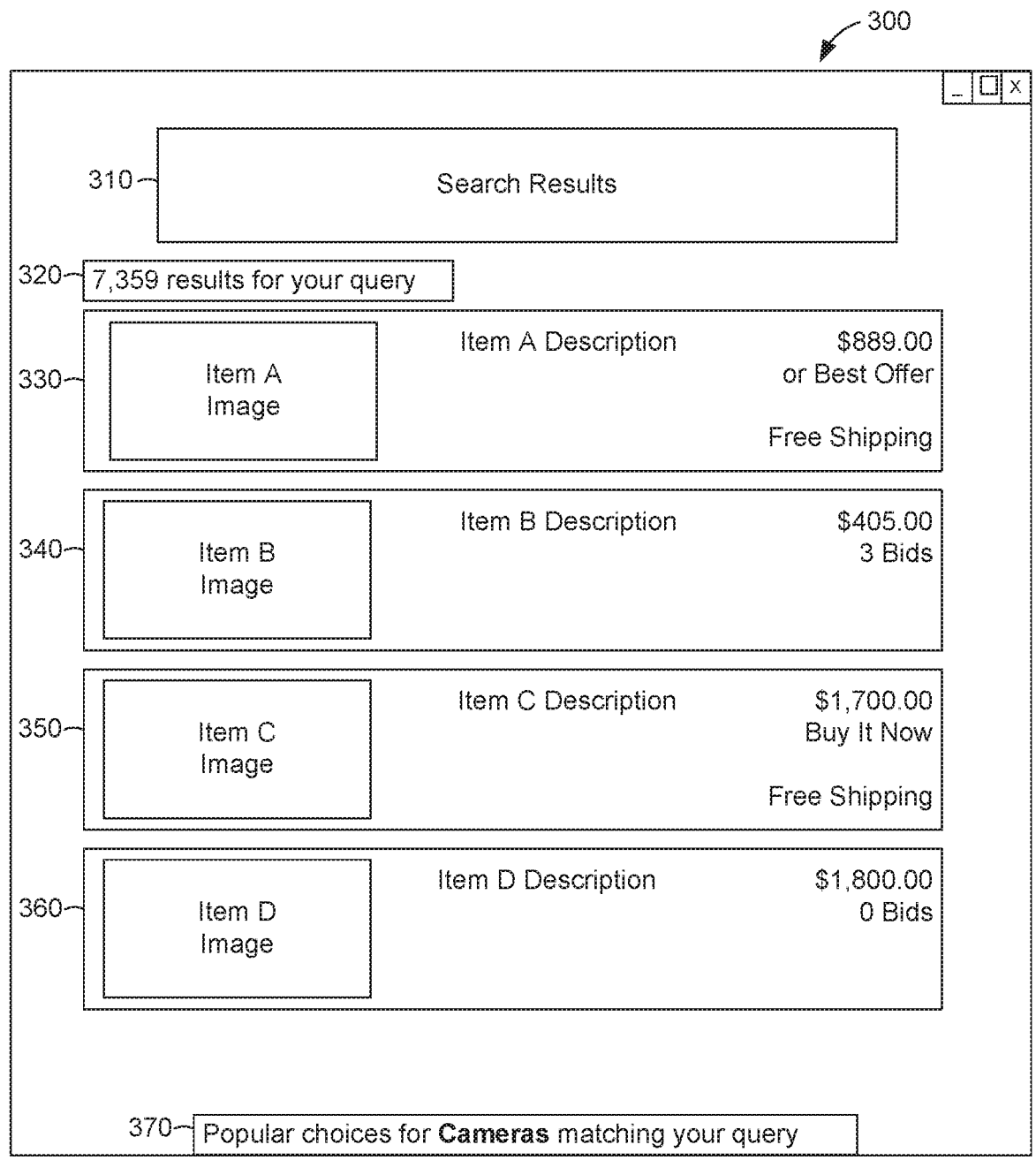
FIG. 3 is a block diagram illustrating a user interface suitable for suggesting a category generated from images, according to some example embodiments.

FIG. 3 is a screen diagram 300 illustrating a user interface suitable for suggesting a category generated from images, according to some example embodiments. As can be seen in screen diagram 300, the user interface includes a title 310, "Search Results," an indicator 320 showing the number of results for the query, a button 370 at the bottom of the screen, and four search results 330-360 in the upper portion of the screen. The screen of FIG. 3 may be presented after a user enters a search query. In some example embodiments, the button 370 is operable to cause the search results to be updated by applying an attribute. For example, the attribute association module 230 may have associated the attribute of being in a category of "Cameras" with the query entered by the user. Accordingly, the button 370 may be operable to submit the query again, with the result set limited to items in the "Cameras" category.

Figure 4:
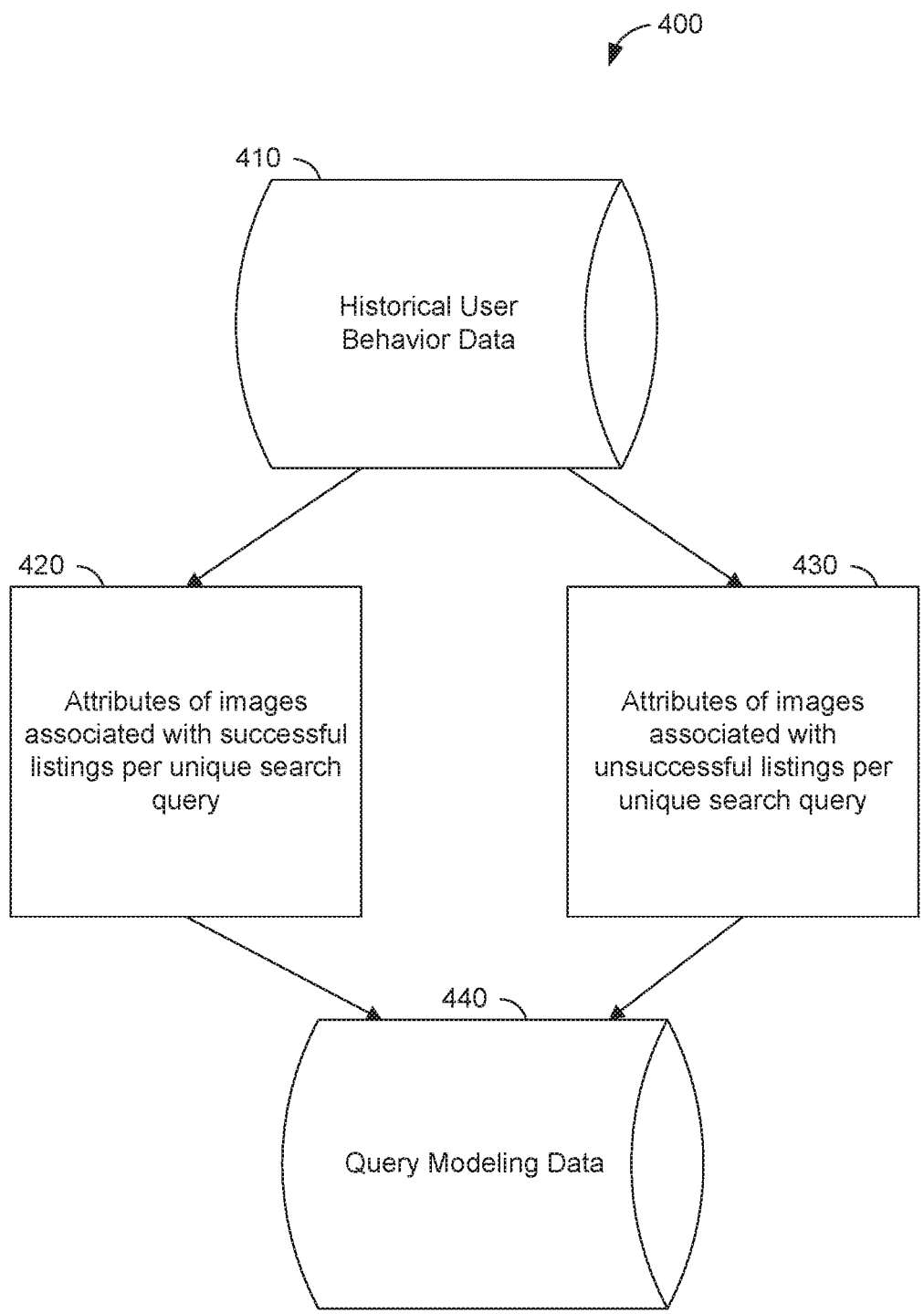
FIG. 4 is a block diagram illustrating factors suitable for generating structured queries from images, according to some example embodiments.

FIG. 4 is a block diagram 400 illustrating factors suitable for generating structured queries from images according to some example embodiments. A database 410 stores historical user behavior data with data regarding the behavior of a number of users of a system (e.g., the e-commerce server 120 or 140). In some example embodiments, data regarding the actions of all users are stored in the database 410.

From the historical user behavior data, usage metrics 420 for attributes of images associated with successful item listings in sessions for each unique search query may be extracted. Similarly, usage metrics 430 for attributes of images associated with unsuccessful item listings in sessions for each unique search query may be extracted. The usage metrics 420 and 430 may be used to model the categories, aspects, and global filters that may be desirable in future uses of the same query and stored in the database 440 as query modeling data. In various example embodiments, different definitions of successful and unsuccessful item listings are used. Examples of successful item listings, in various example embodiments, include: item listings selected (e.g., clicked on) by the user; item listings for items purchased by the user; item listings added to a watch list for the user; item listings commented on by the user; and item listings for which the user communicates with the seller. Examples of unsuccessful item listings, in various embodiments, include: item listings that are not successful under the criteria of the embodiment; item listings that are not successful and were presented to the user; and item listings rejected by an action of the user (e.g., by clicking on a box with an "x" presented in the item listing).

Figure 5:
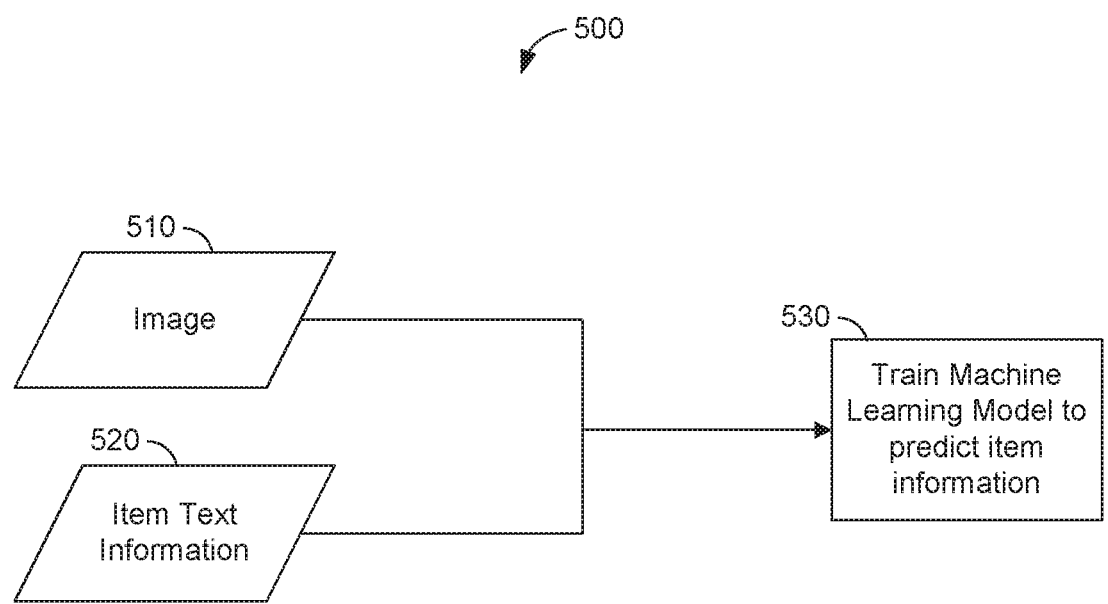
FIG. 5 is a block diagram illustrating training of a machine learning model to generate structured queries from images, according to some example embodiments.

FIG. 5 is a block diagram 500 illustrating training of a machine learning model to generate structured queries from images, according to some example embodiments. A set of images and corresponding attributes is identified for a category. For example, the image 510 and the item text information 520 are identified. In some example embodiments, the image 510 and the item text information 520 are extracted from the same item listing. The category may be a leaf category in a category tree. For example, clothing may be a top-level category, shoes may be a child category of clothing, and men's shoes and women's shoes may each be a child category of shoes. If men's shoes and women's shoes have no further child categories, they are considered to be leaf categories. In some example embodiments, the item text information 520 reflects aspects of the item listing. Alternatively or additionally, the item text information 520 comprises words or phrases in a title of the item listing.

In some example embodiments, item listings used in the process of FIG. 5 are limited to item listings that resulted in a sale. Limiting the listings used for training to those that have resulted in a sale may result in a pool of listings having better congruency between the aspect values of the listing and the actual aspects of the item being sold. A machine learning model is trained in operation 530 to identify attributes based on input images. For example, a convolutional neural network (CNN) may be trained using the images for item listings successfully sold in the category that have the attribute as a positive training set and the images for item listings successfully sold in the category that lack the attribute as a negative training set. The resulting CNN will have a probability of correctly determining for any image associated with an item listing in the category whether or not the item for sale has the attribute.

Figure 6:
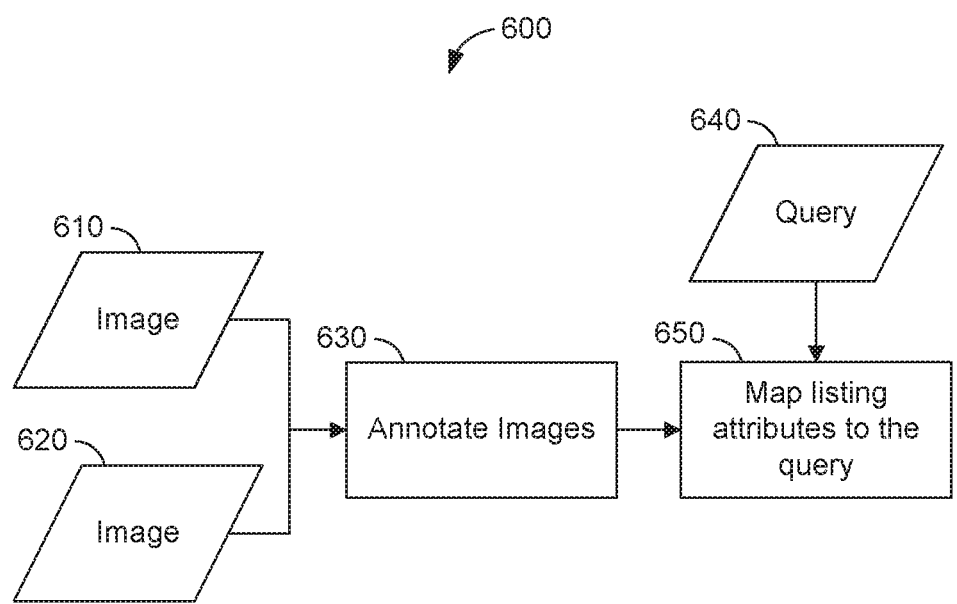
FIG. 6 is a block diagram illustrating training of a machine learning model to generate structured queries from images, according to some example embodiments.

FIG. 6 is a block diagram illustrating a process 600 for training of a machine learning model to generate structured queries from images, according to some example embodiments. A set of images, including the image 610 and the image 620, responsive to a query 640, are provided for annotation (operation 630). In some example embodiments, the set of images only includes images from successful listings responsive to the query 640. One or more image classifiers (e.g., of the image recognition module 220) determines the attributes associated with the images. The image classifier may have been trained as described above with respect to FIG. 5. Based on the annotations produced in operation 630 and the query 640, the listing attributes associated with the set of images are mapped to the query (operation 650).

In some example embodiments, every attribute associated with every image of the set of images is mapped to the query 640. In other example embodiments, a fixed number of most popular attributes is mapped to the query 640. For example, the single attribute shared by the largest number of images may be mapped to the query 640. In still other example embodiments, all attributes exceeding a predetermined count are mapped to the query 640. For example, all attributes associated with at least 10 images of the set of images may be mapped to the query 640. In yet other example embodiments, all attributes exceeding a predetermined frequency are mapped to the query 640. For example, all attributes associated with at least 10% of the images of the set of images may be mapped to the query 640.

In some example embodiments, the e-commerce server 120 or 140 determines the set of images provided for annotation by identifying a candidate set of item listings, the candidate set of item listings comprising items responsive to previous use of the search query 640. The candidate set of item listings are used to create a reduced set of item listings by eliminating from the candidate set of item listings the item listings insufficiently interacted with in response to previous use of the search query 640. The set of images provided for annotation is the reduced set of item listings, in some example embodiments.

In various example embodiments, different criteria are used to determine when an item listing was insufficiently interacted with. For example, any listing never interacted with may be found to be insufficiently interacted with. As another example, any listing interacted with fewer than a predetermined number of times (e.g., five times) may be found to be insufficiently interacted with. As yet another example, any listing interacted with in less than a predetermined percentage of its presentations (e.g., interacted with on fewer than 10% of the times the listing was presented to a user) may be found to be insufficiently interacted with. Additionally, the criteria for identifying an interaction may vary from embodiment to embodiment. In some example embodiments, any interaction at all with the item listing (e.g., viewing the listing, watching the item, bidding on the item, purchasing the item, or making an offer on the item) is counted as an interaction for the purposes of determining whether the listing was sufficiently interacted with. In other example embodiments, only certain predetermined activities are counted as interactions for the purposes of determining whether the listing was sufficiently interacted with. The mere presentation of a search result (e.g., the search result 330) does not constitute an interaction, which always requires some form of action by the user. For example, viewing the listing may be accomplished by tapping on or clicking on the search result, causing the presentation of additional details not shown in the search result. As another example, watching the item may be accomplished by tapping on or clicking on a hot spot in the search result, or may require first viewing the listing and then interacting with a user interface element shown along with the additional details. Watching an item causes the watching user to be notified when events occur with the item listing. For example, a notification may be sent to a watching user when the listing is closing soon (e.g., within 24 hours, within 4 hours, or within another time frame) or when another user outbids the watching user.

Thus, taking FIGS. 5-6 together, in some example embodiments, a machine learning model is trained (e.g., operation 530) to identify attributes of images (e.g., images 610, 620), based on the successful item listings of a category and the attributes assigned to those item listings. The trained machine learning model is then applied to determine the attributes of images responsive to a particular query (e.g., query 640). The attributes of the images responsive to the query are then associated with the query. Accordingly, the attribute association server 130 is configured to provide the attributes associated with particular queries, as utilized by the processes 700 and 800, described below.

Figure 7:
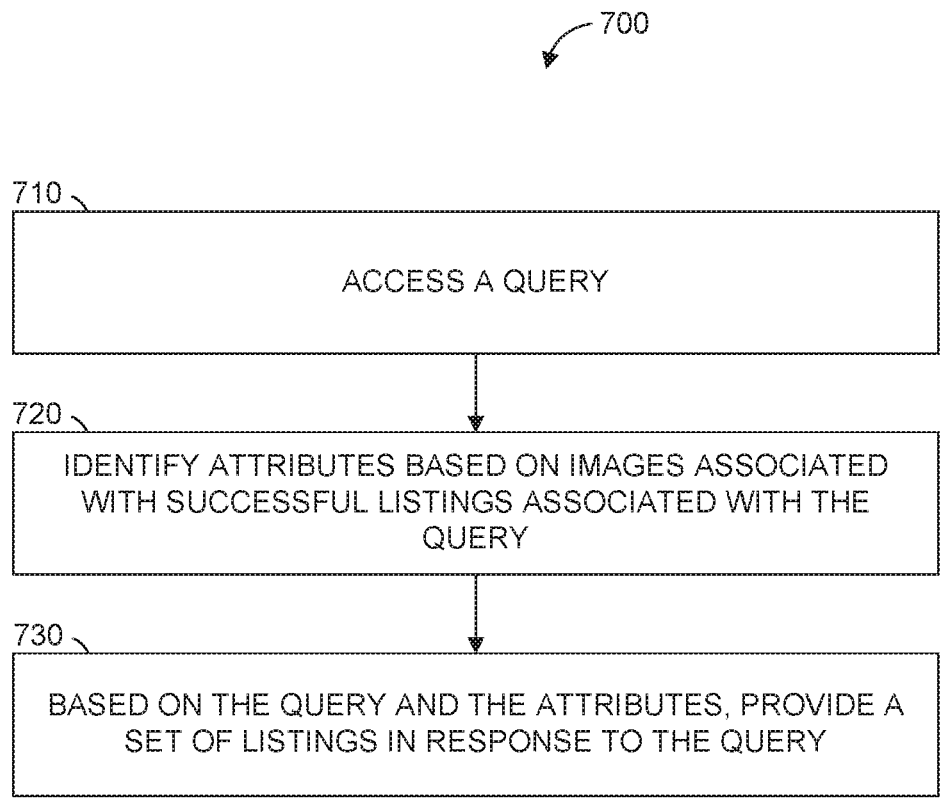
FIG. 7 is a flowchart illustrating operations of a server in performing a process of generating structured queries from images, according to some example embodiments.

FIG. 7 is a flowchart illustrating operations of a server in performing a process 700 of generating structured queries from images, according to some example embodiments. The process 700 includes operations 710, 720, and 730. By way of example only and not limitation, the operations 710-730 are described as being performed by the modules 210-250.

In operation 710, the attribute association module 230 accesses a query. In some example embodiments, a user of an e-commerce site may submit the query from a device 150 to an e-commerce server 120 or 140. The e-commerce server 120 or 140 submits the query to the attribute server 130, which accesses the query. In other example embodiments, queries are stored in a database and accessed from the database.

In operation 720, the attribute association module 230 identifies attributes associated with the query, based on images associated with successful listings associated with the query. For example, referring to the process 600, the listing attributes mapped in the operation 650 may be stored in a database for access in operation 720. The identified attributes may textually match one or more words of the query or be textually distinct. For example, in the search for "red nike shoes," if an attribute of "brand::nike" is found, the attribute textually matches a word in the query. As another example, in the same search, if an attribute of "style::basketball" is found, the attribute is textually distinct from all words of the query.

In operation 730, e-commerce server 120 or 140 evaluates the query, including the attributes determined in operation 720. A set of item listings matching the query and the attributes is provided to the device 150 in response to the query. For example, if the query were for "Xbox® console" a search for the text alone might return listings for many Xbox® games, since the listings may describe the game as being compatible with the Xbox® console. However, a user specifying "console" in the query is likely looking for the console, and not a game. Accordingly, analysis of previous successful listings by the process 600 will likely link the attribute of "game system" to the query for "Xbox® console." As a result, in operation 730, the set of listings provided in response to the query is limited to those listings having the attribute of "game system," excluding the results lacking that attribute, such as games for the system. The listings provided in operation 730 may be transmitted from the e-commerce server 120 or 140 to the user device 150 for display to the user on a web browser or dedicated application running on the device 150.

One or more of the attributes identified in operation 720 may conflict with attributes provided with the accessed query. For example, if the query were for "Xbox® console," but the user specifically indicated that the query should be applied to listings having the attribute of "game," the attribute identified in operation 720 would conflict with the attribute identified by the user. Accordingly, in some example embodiments, the automatically-identified attribute is ignored, and the user-supplied attribute is used. Since multiple attributes may be identified in operation 720, in some example embodiments, the non-conflicting, automatically-identified attributes are used along with the user-defined attributes. In other example embodiments, if a conflict is found, only the user-defined attributes are used.

Figure 8:
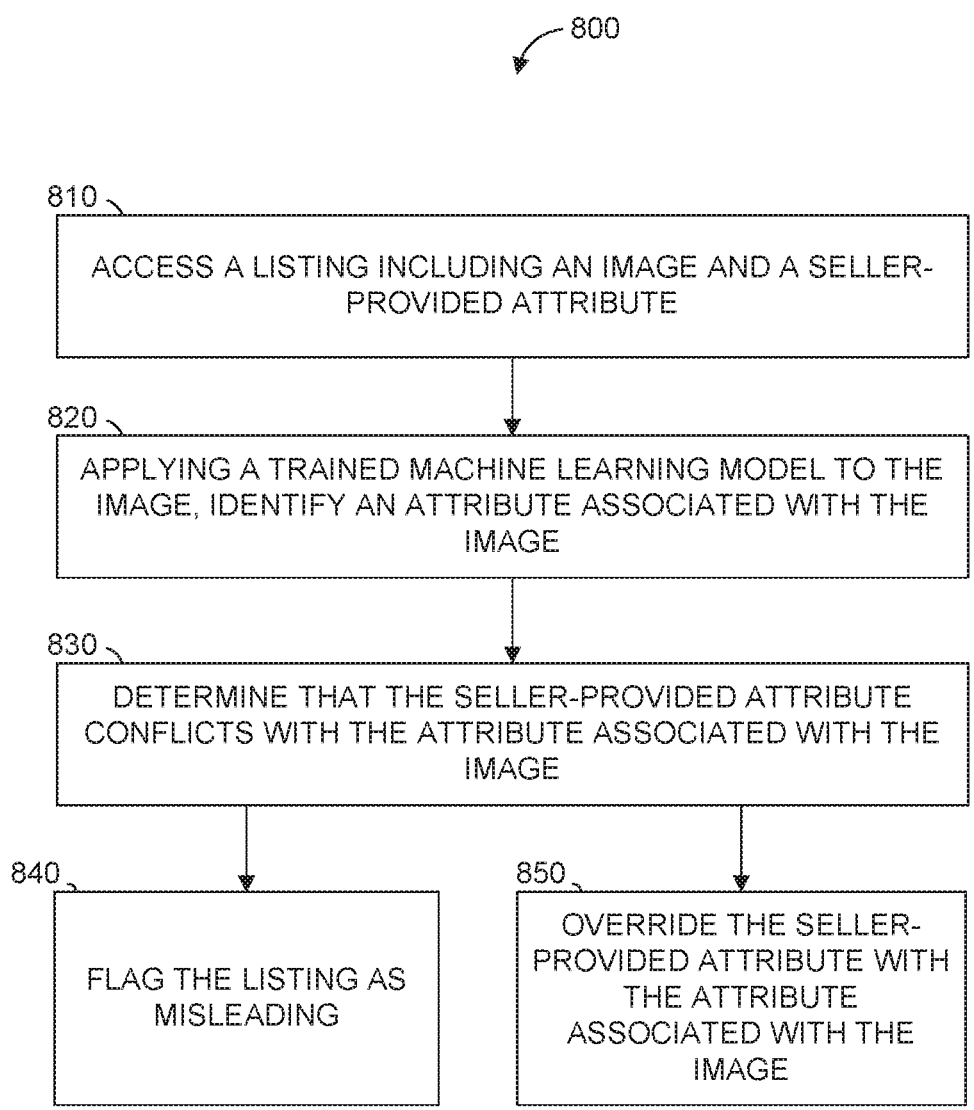
FIG. 8 is a flowchart illustrating operations of a server in performing a process of generating structured queries from images, according to some example embodiments.

FIG. 8 is a flowchart illustrating operations of a server in performing a process 800 of generating structured queries from images, according to some example embodiments. The process 800 includes operations 810, 820, 830, 840, and 850. By way of example only and not limitation, the operations 810-850 are described as being performed by the attribute server 130 and the e-commerce server 120 or 140.

In operation 810 the e-commerce server 120 or 140 accesses a listing that includes an image and a seller-provided attribute. For example, the listing may be an item listing for an Xbox® gaming system and the seller-provided attribute may indicate that the system includes a 1 TB hard drive. The image may depict a box showing the specific Xbox® that is actually for sale.

In operation 820, the e-commerce server 120 or 140 causes a trained machine learning model to be applied to the image and, based on the results of the trained machine learning model, identifies an attribute associated with the image. For example, the e-commerce server 120 or 140 may send the image to the attribute server 130 for processing. The image recognition module 220 of the attribute server 130 may determine that the depicted Xbox® is a 500 GB model. As a result, the attribute server 130 sends an identifier for the attribute back to the e-commerce server 120 or 140.

In operation 830, the e-commerce server 120 or 140 determines that the seller-provided attribute (e.g., 1 TB) conflicts with the attribute associated with the image (e.g., 500 GB). In this example, since an individual Xbox® cannot be both a 1 TB model and a 500 GB model, the attributes conflict. By contrast, the 500 GB model attribute does not conflict with attributes such as model year or color.

In response to determining that a conflict exists, one or both of operations 840 and 850 is performed. In operation 840, the listing is flagged as misleading, for review by an administrator. For example, an alert regarding the listing may be sent by email to a predefined administrator account. In response to receiving the email, the administrator can review the listing and correct the listing, send a warning to the creator of the listing, or determine that the listing is correct and clear the flag.

In operation 850, the seller-provided attribute is automatically removed and replaced with the attribute associated with the image. For example, the 1 TB attribute of the Xbox® can be removed and the 500 GB attribute set instead.

According to various example embodiments, one or more of the methodologies described herein may facilitate identifying attributes of items depicted in images. Moreover, one or more of the methodologies described herein may improve the quality of search results presented to users. Furthermore, one or more of the methodologies described herein may improve the accuracy of attributes associated with listings.

When these effects are considered in aggregate, one or more of the methodologies described herein may obviate a need for certain efforts or resources that otherwise would be involved in searching for item listings or improving the accuracy of attributes associated with listings. Efforts expended by a user in finding items of interest may also be reduced by one or more of the methodologies described herein. For example, accurately identifying an item of interest for a user may reduce the amount of time or effort expended by the user in finding an item to purchase. As another example, improving the accuracy of attributes associated with item listings may reduce the effort involved in creating an accurate listing, in administering an e-commerce system that includes item listings, and in searching for items based on attributes. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Software Architecture

Figure 9:
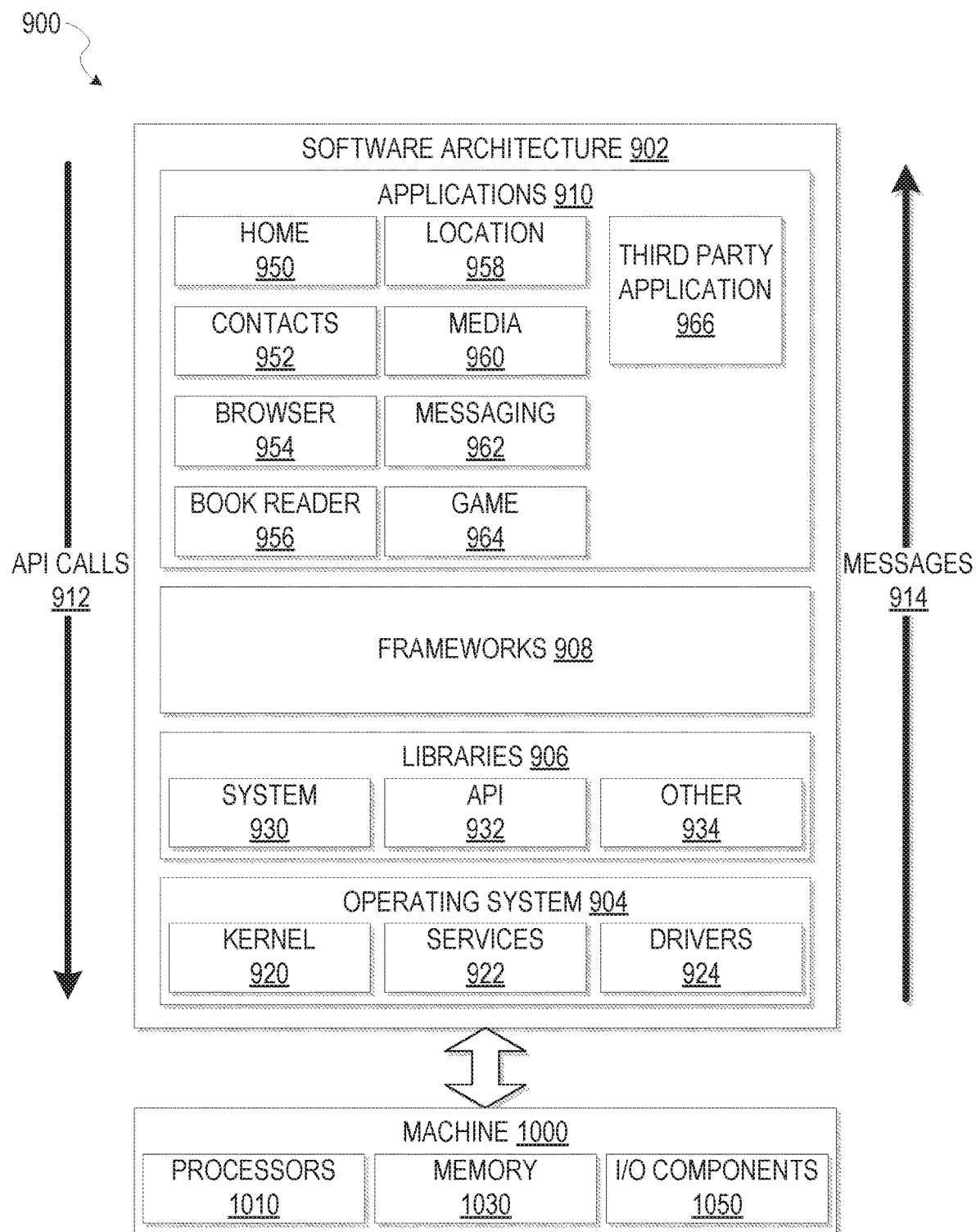
FIG. 9 is a block diagram illustrating an example of a software architecture that may be installed on a machine, according to some example embodiments.

FIG. 9 is a block diagram 900 illustrating a software architecture 902, which may be installed on any one or more of the devices described above. FIG. 9 is merely a non-limiting example of a software architecture, and it will be appreciated that many other architectures may be implemented to facilitate the functionality described herein. The software architecture 902 may be implemented by hardware such as machine 1000 of FIG. 10 that includes processors 1010, memory 1030, and input/output (I/O) components 1050. In this example architecture, the software architecture 902 may be conceptualized as a stack of layers where each layer may provide a particular functionality. For example, the software architecture 902 includes layers such as an operating system 904, libraries 906, frameworks 908, and applications 910. Operationally, the applications 910 invoke application programming interface (API) calls 912 through the software stack and receive messages 914 in response to the API calls 912, according to some implementations.

In various implementations, the operating system 904 manages hardware resources and provides common services. The operating system 904 includes, for example, a kernel 920, services 922, and drivers 924. The kernel 920 acts as an abstraction layer between the hardware and the other software layers in some implementations. For example, the kernel 920 provides memory management, processor management (e.g., scheduling), component management, networking, security settings, among other functionality. The services 922 may provide other common services for the other software layers. The drivers 924 may be responsible for controlling or interfacing with the underlying hardware. For instance, the drivers 924 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 906 provide a low-level common infrastructure that may be utilized by the applications 910. The libraries 906 may include system libraries 930 (e.g., C standard library) that may provide functions such as memory allocation functions, string manipulation functions, mathematic functions, and the like. In addition, the libraries 906 may include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 may also include a wide variety of other libraries 934 to provide many other APIs to the applications 910.

The frameworks 908 provide a high-level common infrastructure that may be utilized by the applications 910, according to some implementations. For example, the frameworks 908 provide various graphic user interface (GUI) functions, high-level resource management, high-level location services, and so forth. The frameworks 908 may provide a broad spectrum of other APIs that may be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as third party application 966. According to some embodiments, the applications 910 are programs that execute functions defined in the programs. Various programming languages may be employed to create one or more of the applications 910, structured in a variety of manners, such as object-orientated programming languages (e.g., Objective-C, Java, or C++) or procedural programming languages (e.g., C or assembly language). In a specific example, the third party application 966 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 966 may invoke the API calls 912 provided by the mobile operating system 904 to facilitate functionality described herein.

Example Machine Architecture and Machine-Readable Medium

Figure 10:
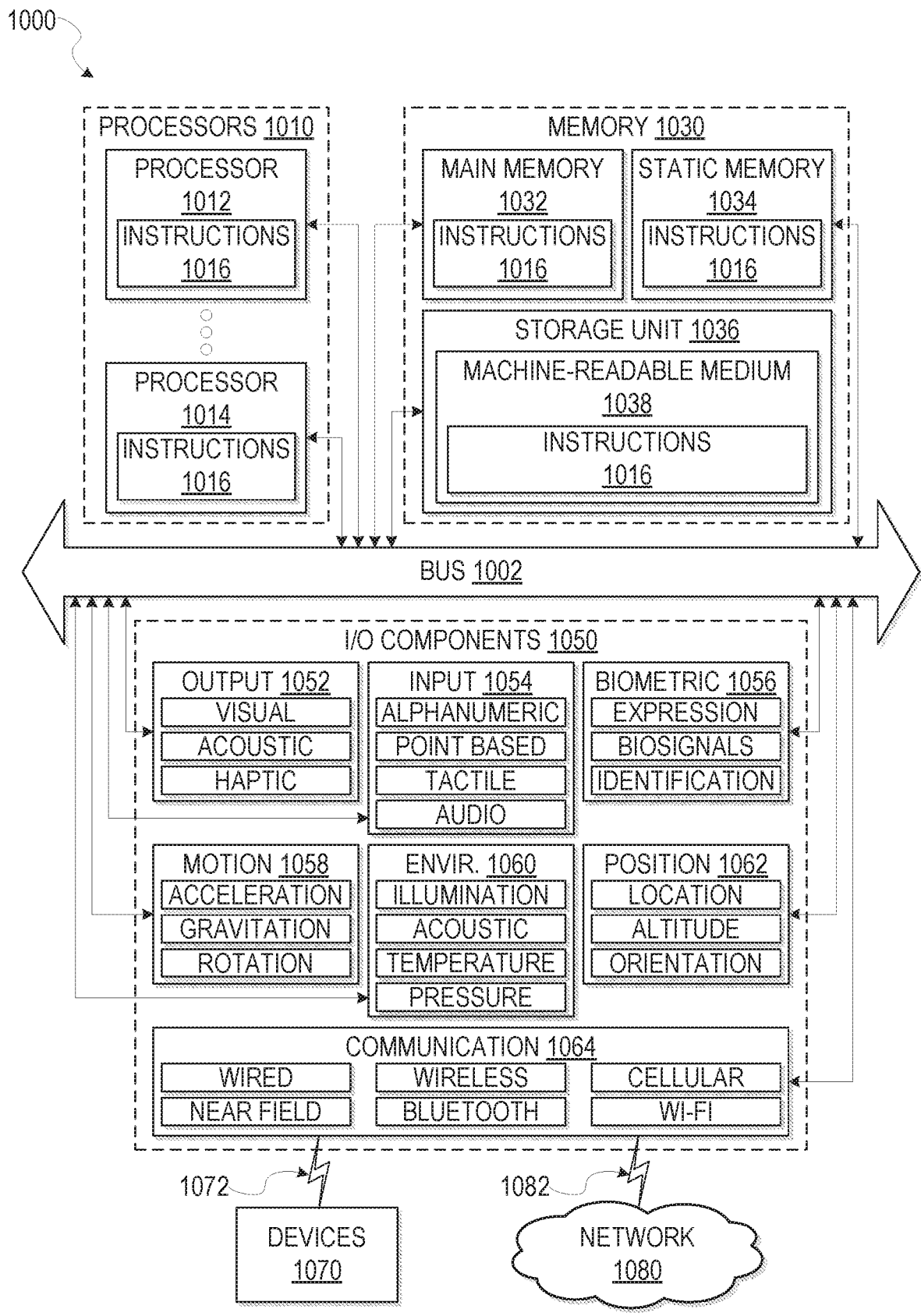
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein. As a practical matter, certain embodiments of the machine 1000 may be more suitable to the methodologies described herein. For example, while any computing device with sufficient processing power may serve as the attribute server 130, accelerometers, cameras, and cellular network connectivity are not directly related to the ability of the attribute server 130 to perform the attribute association methods discussed herein. Accordingly, in some example embodiments, cost savings are realized by implementing the various described methodologies on machines 1000 that exclude additional features unnecessary to the performance of the tasks assigned to each machine 1000 (e.g., by implementing the attribute server 130 in a server machine without a directly connected display and without integrated sensors commonly found only on wearable or portable devices).

The machine 1000 may include processors 1010, memory 1030, and I/O components 1050, which may be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processors that may comprise two or more independent processors (also referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory 1030 may include a main memory 1032, a static memory 1034, and a storage unit 1036 accessible to the processors 1010 via the bus 1002. The storage unit 1036 may include a machine-readable medium 1038 on which is stored the instructions 1016 embodying any one or more of the methodologies or functions described herein. The instructions 1016 may also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various implementations, the main memory 1032, static memory 1034, and the processors 1010 are considered as machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, in some implementations, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1064, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a memory having instructions embodied thereon; and
one or more processors configured by the instructions to perform operations comprising:
accessing a listing that includes an image and a seller-provided attribute;
applying an image classifier to the image, the image classifier trained to identify an attribute associated with the image; and
based on the applying, automatically identifying the attribute associated with the image;
comparing the automatically identified attribute to the seller-provided attribute;
determining the seller-provided attribute conflicts with the automatically identified attribute, the automatically identified attribute and the seller-provided attribute corresponding to a size, a brand, a color, a category, or a style; and
upon determining the seller-provided attribute conflicts with the automatically identified attribute, automatically replacing or providing an option to replace the seller-provided attribute with the automatically identified attribute for the listing.

2. The system of claim 1, wherein the processing comprises determining an identifier for the attribute of the image.

3. The system of claim 2, further comprising, upon determining the seller-provided attribute conflicts with the attribute, flagging the listing as misleading.

4. The system of claim 1, further comprising, upon determining the seller-provided attribute conflicts with the attribute, communicating an alert for the listing to an administrator for review.

5. The system of claim 1, wherein the attribute or seller-provided attribute includes at least one of a size, a brand, or a style.

6. The system of claim 1, wherein the seller-provided attribute is based on text associated with the listing.

7. The system of claim 1, further comprising training the image classifier to identify the attribute associated with the image based on attributes associated with images of other listings.

8. A method comprising:
accessing a listing that includes an image and a seller-provided attribute;
applying an image classifier to the image, the image classifier trained to identify an attribute associated with the image;
based on the applying, automatically identifying the attribute associated with the image;
comparing the automatically identified attribute to the seller-provided attribute;
determining the seller-provided attribute conflicts with the automatically identified attribute, the automatically identified attribute and the seller-provided attribute corresponding to a size, a brand, a color, a category, or a style; and
upon determining the seller-provided attribute conflicts with the automatically identified attribute, automatically replacing or providing an option to replace the seller-provided attribute with the automatically identified attribute for the listing.

9. The system of claim 8, wherein the attribute or seller-provided attribute includes at least one of a size, a brand, or a style.

10. The system of claim 8, wherein the seller-provided attribute is based on text associated with the listing.

11. The system of claim 8, further comprising training the image classifier to identify the attribute associated with the image based on attributes associated with images of other listings.

12. A machine-readable medium having instructions embodied thereon, the instructions executable by one or more processors of a machine to perform operations comprising:
accessing a listing that includes an image and a seller-provided attribute;
automatically determining an attribute of the image;
comparing the automatically identified attribute to the seller-provided attribute;
determining the seller-provided attribute conflicts with the automatically identified attribute, the automatically identified attribute and the seller-provided attribute corresponding to a size, a brand, a color, a category, or a style;
flagging the listing as misleading; and
upon determining the seller-provided attribute conflicts with the automatically identified attribute, automatically replacing or providing an option to replace the seller-provided attribute with the automatically identified attribute for the listing.

13. The system of claim 12, wherein the attribute or seller-provided attribute includes at least one of a size, a brand, or a style.

14. The system of claim 12, wherein the seller-provided attribute is based on text associated with the listing.

15. The system of claim 12, further comprising training the image classifier to identify the attribute associated with the image based on attributes associated with images of other listings.

16. The system of claim 12, further comprising communicating an alert for the listing to an administrator for review.

\* \* \* \* \*